United States Patent
Teo et al.

(10) Patent No.: US 7,675,630 B2
(45) Date of Patent: Mar. 9, 2010

(54) SYSTEM AND METHOD FOR SELECTIVELY SETTING OPTICAL NAVIGATION RESOLUTION

(75) Inventors: Chiang Mei Teo, Penang (MY); Angeline Saw Khoon Khoo, Penang (MY); Boon How Kok, Penang (MY); Ming Yong Mau, Penang (MY); Qing Xing Chen, Kuala Lumpur (MY); Sze Yin Lee, Penang (MY); Beng Chye Lye, Penang (MY)

(73) Assignee: Avago Technologies ECBU IP (Singapore) Pte. Ltd. (SG)

( * ) Notice: Subject to any disclaimer, the term of this patent is extended or adjusted under 35 U.S.C. 154(b) by 43 days.

(21) Appl. No.: 11/626,780

(22) Filed: Jan. 24, 2007

(65) Prior Publication Data

US 2008/0174787 A1 Jul. 24, 2008

(51) Int. Cl.
*G01B 11/14* (2006.01)
*G06F 3/033* (2006.01)

(52) U.S. Cl. .................................... 356/614; 345/157
(58) Field of Classification Search ................ 356/614, 356/622; 250/208.1, 557; 345/163–168
See application file for complete search history.

(56) References Cited

U.S. PATENT DOCUMENTS

| 5,644,139 | A * | 7/1997 | Allen et al. ............... 250/557 |
| 6,303,924 | B1 * | 10/2001 | Adan et al. .............. 250/221 |
| 6,983,080 | B2 | 1/2006 | Wenstrand et al. |
| 2005/0001817 | A1 * | 1/2005 | Lauffenburger et al. ..... 345/166 |
| 2005/0248533 | A1 * | 11/2005 | Chu ........................ 345/163 |

* cited by examiner

*Primary Examiner*—Tarifur Chowdhury
*Assistant Examiner*—Tara S Pajoohi

(57) ABSTRACT

A system and method for selectively setting an optical navigation resolution utilizes a comparison of a comparison displacement value to a threshold value to set the optical navigation resolution to an effective resolution selected from a plurality of effective resolutions. The comparison displacement value is based on at least one of a first displacement value in a first direction and a second displacement value in a second direction, which were derived for estimating motion.

20 Claims, 7 Drawing Sheets

SYSTEM AND METHOD FOR SELECTIVELY SETTING OPTICAL NAVIGATION RESOLUTION

BACKGROUND OF THE INVENTION

Optical navigation systems operate to estimate movements on target surfaces to perform tracking operations. An optical navigation system uses a light source, such as a light-emitting diode (LED) or a laser diode, to illuminate a region of a target surface and an image sensor to receive the light reflected from the target surface to successively capture frames of image data of the target surface. The optical navigation system compares the successive image frames and estimates the relative movements based on the comparison between the current image frame and a previous image frame. The comparison is based on detecting and computing displacements of features in the captured frames of image data.

Optical navigation systems are commonly used in optical computer mice to track the movements of the mice relative to the surfaces on which the mice are manually manipulated. The movements of a computer mouse are used to control a cursor on a monitor of a computer system. The accuracy of an optical computer mouse with respect to the positioning of the cursor mostly depends on the resolution of the mouse. Higher resolution means that a user can move the cursor faster to specific locations on the monitor with the slightest nudge.

A concern with a conventional optical computer mouse is that a user may find difficulties in controlling the motion of a cursor using the optical computer mouse, especially when the optical computer mouse is set at a high resolution. This is because at higher resolutions, the user will experience greater sensitivity with respect to the movements of the cursor. At such a setting, the user may find that the cursor movements are harder to control at lower speeds using the optical computer mouse.

Thus, there is a need for an optical navigation system that can be used in an optical computer mouse, which allows a user to more easily control a computer cursor at various speeds, even at low speeds.

SUMMARY OF THE INVENTION

A system and method for selectively setting an optical navigation resolution utilizes a comparison of a comparison displacement value to a threshold value to set the optical navigation resolution to an effective resolution selected from a plurality of effective resolutions. The comparison displacement value is based on at least one of a first displacement value in a first direction and a second displacement value in a second direction, which were derived for estimating motion. The system and method sets the optical navigation resolution to a lower effective resolution at low speeds, as indicated by at least one of the first and second displacement values. The system and method can be implemented in an optical navigation system for an optical computer mouse, which allows a user to more easily control a computer cursor at various speeds, even at low speeds, using the optical computer mouse.

A method for selectively setting an optical navigation resolution in accordance with an embodiment of the invention comprises reading a first displacement value in a first direction and a second displacement value in a second direction, the first and second displacement values being derived for estimating motion, deriving a comparison displacement value based on at least one of the first and second displacement values, comparing the comparison displacement value to a threshold value, and setting the optical navigation resolution to an effective resolution selected from a plurality of effective resolutions in response to the comparing of the comparison displacement value to the threshold value.

A system in accordance with an embodiment of the invention comprises an image sensor, a navigation engine and a resolution-setting module. The image sensor is configured to capture frames of image data. The navigation engine is operably connected to the image sensor to receive the frames of image data. The navigation engine is configured to generate a first displacement value in a first direction and a second displacement value in a second direction using the frames of image data. The resolution-setting module is operably connected to the navigation engine to receive the first and second displacement values. The resolution-setting module is configured to derive a comparison displacement value based on at least one of the first and second displacement values and to set an optical navigation resolution to an effective resolution selected from a plurality of effective resolutions in response to a comparison of the comparison displacement value to a threshold value.

Other aspects and advantages of the present invention will become apparent from the following detailed description, taken in conjunction with the accompanying drawings, illustrated by way of example of the principles of the invention.

DETAILED DESCRIPTION

Figure 1:
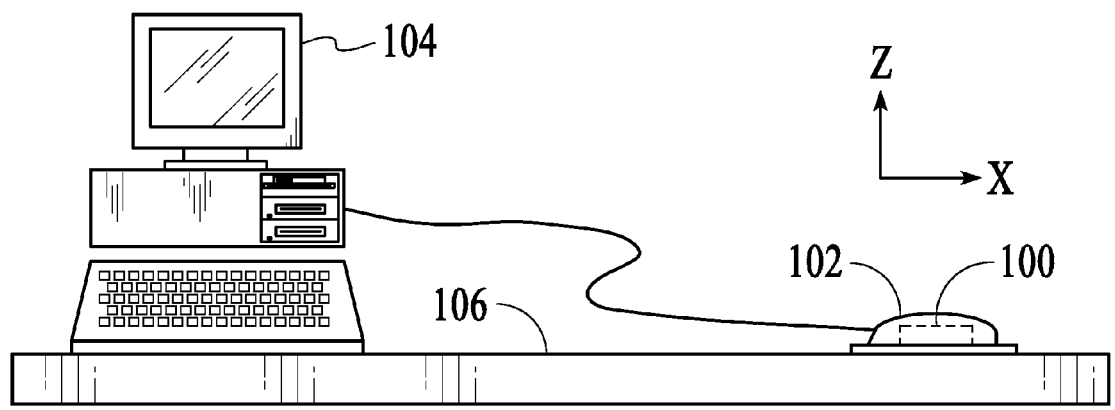
FIG. 1 shows an optical navigation system included in an optical computer mouse in accordance with an embodiment of the invention.

With reference to FIG. 1, an optical navigation system 100 in accordance with an embodiment of the invention is described. As shown in FIG. 1, the optical navigation system 100 is included in an optical computer mouse 102, which is connected to a computer 104. In this implementation, the optical navigation system 100 is used to track the movements of the optical mouse 102 as the optical mouse is manipulated over a target surface 106 by a user to control a cursor displayed on the computer 104. However, in other implementations, the optical navigation system 100 can be used in different products for various tracking applications. As described in detail below, the optical navigation system 100 is configured to selectively set the resolution of the system based on the speed at which the optical computer mouse 102 is being manipulated. In particular, at lower speeds, the resolution of the optical navigation system 100 is decreased to provide better control of the cursor for the user using the optical computer mouse 102.

Figure 2:
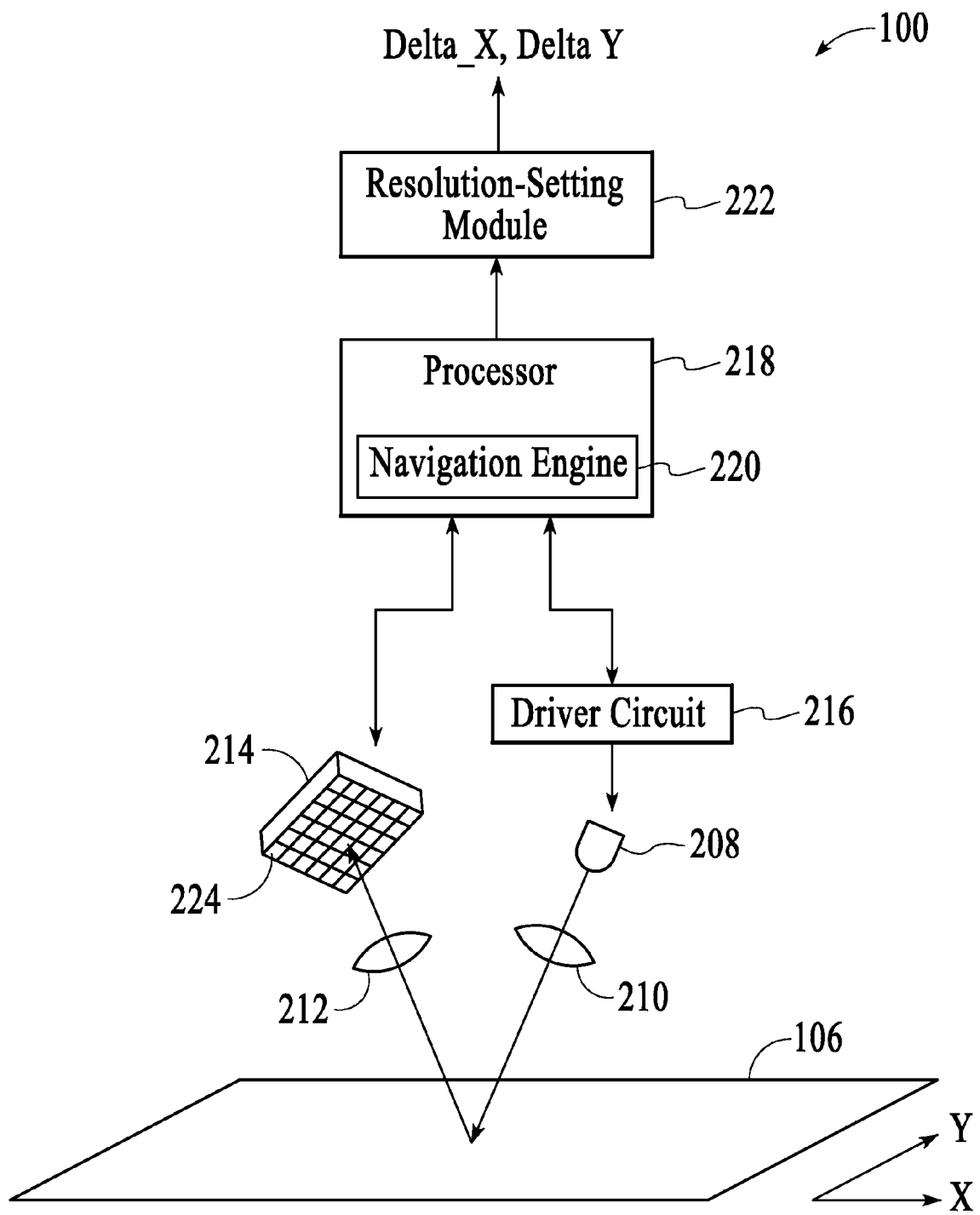
FIG. 2 is a diagram of the optical navigation system in accordance with an embodiment of the invention.

As shown in FIG. 2, the optical navigation system 100 includes a light source 208, a focusing lens 210, an imaging lens 212, an image sensor 214, a driver circuit 216, a processor 218 with a navigation engine 220 and a resolution-setting module 222. Although these components of the optical navigation system 100 are shown in FIG. 2 as being separate components, some of these components may be integrated. As an example, the image sensor 214, the driver circuit 216 and the processor 218 with the navigation engine 220 may be implemented in a single integrated circuit chip. Furthermore, some of the components of the optical navigation system 100, such as the navigation engine 220 and the resolution-setting module 222, may be implemented in any combination of software, hardware and/or firmware.

The light source 208 is configured to generate light in response to applied driving signal. The light source 208 can be any type of a light emitting device, such as a light-emitting diode or a laser diode. As an example, the light source may be a vertical-cavity surface-emitting laser (VCSEL), which generates coherent laser beam of light. The light source 208 is activated by the driver circuit 216, which provides driving signals to the light source. The focusing lens 210 is positioned between the light source 208 and the target surface 106 to focus the light from the light source onto a region of the target surface. The imaging lens 212 is positioned between the target surface 106 and the image sensor 214 to focus the light reflected off the target surface onto the image sensor.

The image sensor 214 is configured to capture frames of image data of the target surface 106 for motion estimation. The image sensor 214 includes photosensitive pixel elements 224 that generate image data in response to light incident on the elements. As an example, the image sensor 106 may be a charge-coupled device (CCD) image sensor or a complementary metal oxide semiconductor (CMOS) image sensor. The number of photosensitive pixel elements 224 included in the image sensor 214 may vary depending on at least the particular application of the optical navigation system 100. As an example, the image sensor 214 may include a 30×30 array of photosensitive pixel elements.

The processor 218 is configured to control the driver circuit 216 and the image sensor 214 in order to capture frames of image data of the target surface 106. The processor 218 is electrically connected to the driver circuit 216 and the image sensor 214 to provide control signals. The processor 218 provides control signals to the driver circuit 216 to direct the driver circuit to apply driving signals to the light source 208 to activate the light source. The processor 218 provides control signals to the image sensor 214 to accumulate electrical charges at the photosensitive pixel elements 224 and integrate at least some of the photosensitive pixel elements to produce each frame of image data of the target surface 106. Thus, the processor 218 is able to control the frame rate of the image sensor 214.

The processor 218 includes the navigation engine 220, which is programmed into the processor. The navigation engine 220 operates to correlate frames of image data captured by the image sensor 214 to estimate displacement changes between the optical navigation system 100 and the target surface 106 with respect to X and Y directions. The process of correlating frames of image data for motion estimation or navigation is well known, and thus, is not described herein. The output of the navigation engine 220 includes a directional delta X displacement value and a directional delta Y displacement value. Each directional displacement value includes a negative or positive sign information, which indicates direction, and an absolute displacement value, which indicates the amount of displacement in that direction. In a particular implementation, the directional delta X and Y displacement values are generated in the form of hex numbers.

The resolution-setting module 222 is configured to automatically set or switch the resolution of the optical navigation system 100 to an effective resolution, depending on the current speed at which the optical navigation system is being manipulated. In particular, the resolution-setting module 222 operates to set the resolution of the optical navigation system 100 to a lower effective resolution at lower speeds to allow a user to better control the cursor using the optical navigation system 100. The current speed of the optical navigation system 100 can be determined using the directional delta X and Y displacement values from the navigation engine 220, as described in detail below. In an embodiment, the effective resolution may be selected from a high effective resolution and a low effective resolution. However, in other embodiments, the effective resolution may be selected from any number of selectable effective resolutions. In an embodiment, the resolution-setting module 222 sets the effective resolution of the optical navigation system 100 by changing the resolution setting of the navigation engine 220. Thus, in this embodiment, the change in the resolution is reflected by the output values of the navigation engine 220. In other embodiments, the resolution-setting module 222 sets the effective resolution of the optical navigation system 100 by modifying the output values of the navigation engine 220 to reflect the change in the resolution. In some embodiments, the effective resolution of each of the directional delta X and Y values may be independently set by the resolution-setting module 222, depending on the current speed in the X direction and the current speed in the Y direction. The resolution of the optical navigation system 100 will sometimes be referred to herein as the optical navigation resolution.

Figure 3:
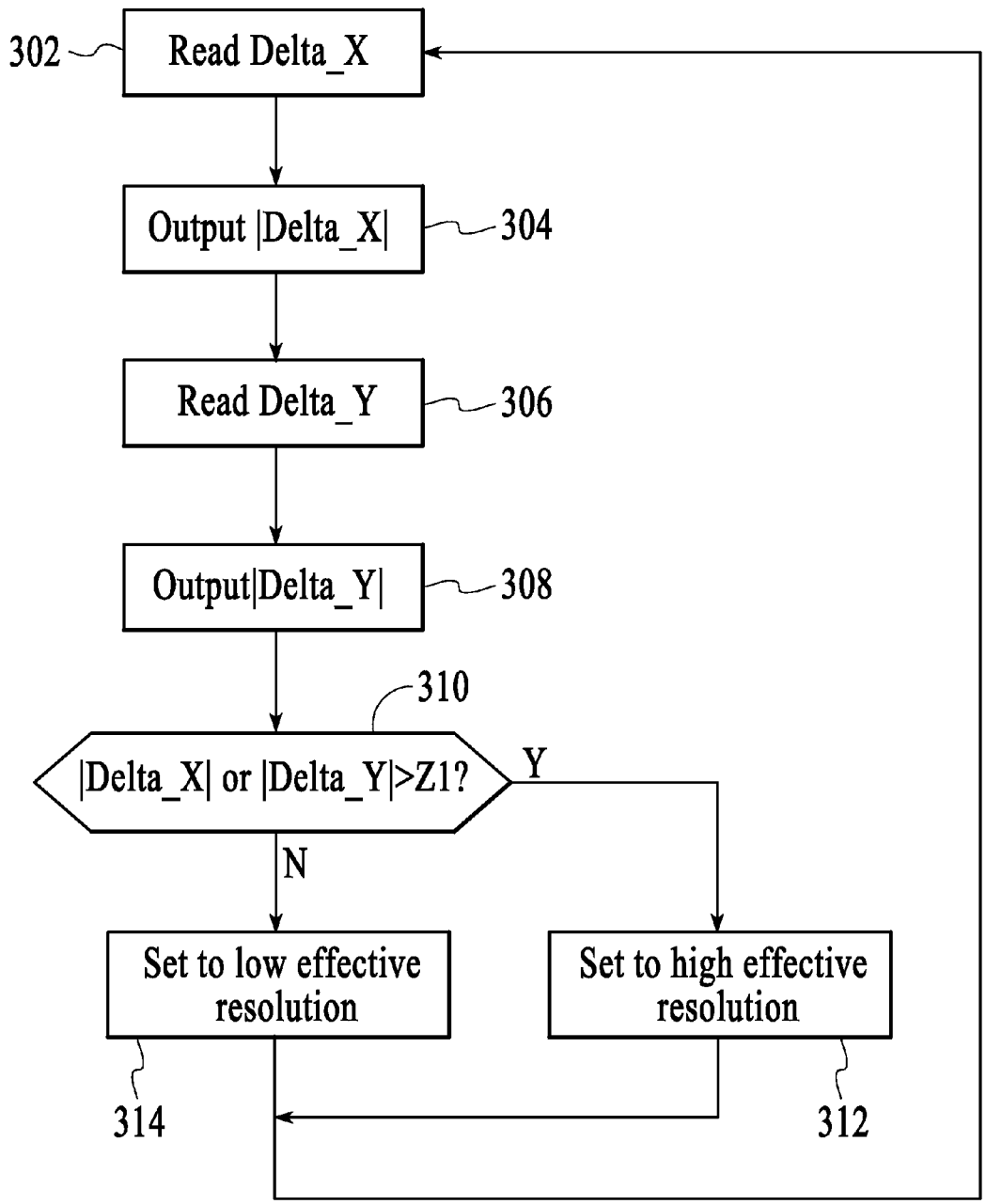
FIG. 3 is a process flow diagram of an operation of a resolution-setting module of the optical navigation system in accordance with an embodiment of the invention.

The operation of the resolution-setting module 222 in accordance with an embodiment of the invention is described with reference to a flow diagram of FIG. 3. In this embodiment, the resolution of the navigation engine 220, i.e., the resolution of the displacement values generated by the navigation engine, is fixed at a default setting of 1000 counts per inch (cpi) in both the X and Y directions. The operation begins after the navigation engine 220 outputs the current directional delta X displacement value, Delta_X, and the current directional delta Y displacement value, Delta_Y. At block 302, Delta_X is read. Next, at block 304, the absolute value of Delta_X is outputted. In addition, the sign of Delta_X is stored for subsequent use. Next, at block 306, Delta_Y is read. Next, at block 308, the absolute value of Delta_Y is outputted. In addition, the sign of Delta_Y is stored for subsequent use. Next, at block 310, a determination is made whether the absolute value of Delta_X or the absolute value of Delta_Y is greater than a threshold value of Z1. Thus, in this embodiment, the absolute values of Delta_X and Delta_Y are used as comparison displacement values, which indicate the current speed of the optical navigation system 100. The Z1 value represents the number of pixels that corresponds to a predefined threshold speed of the optical navigation system 100 to switch the optical navigation resolution between a high effective resolution, e.g., 1000 cpi, and a low effective resolution, e.g., 500 cpi. As an example, the Z1 value may be the number of pixels that equals a movement at 2 inches per second (ips).

If the absolute value of Delta_X or the absolute value of Delta_Y is greater than Z1, then the operation proceeds to block 312, where the optical navigation resolution is set to the high effective resolution. In this embodiment, the optical navigation resolution is set to the high effective resolution by not changing the resolution setting of the navigation engine 220, which is currently set to a resolution that corresponds to the high effective resolution. If the absolute value of Delta_X or the absolute value of Delta_Y is not greater than Z1, then the operation proceeds to block 314, where the resolution of the optical navigation device is set to the low effective resolution. In this embodiment, the optical navigation resolution is set to the low effective resolution by changing the resolution setting of the navigation engine 220 to a lower resolution that corresponds to the low effective resolution.

The operation then proceeds back to block 302 to set the optical navigation resolution using the latest Delta_X and Delta_Y. Blocks 302-314 may be executed every motion read cycle. Alternatively, blocks 302-314 may be executed every Nth motion read cycle, where N is greater than one. In this fashion, the resolution of the optical navigation system 100 can be continuously adjusted depending on the speed at which the optical navigation system is being manipulated.

Figure 4:
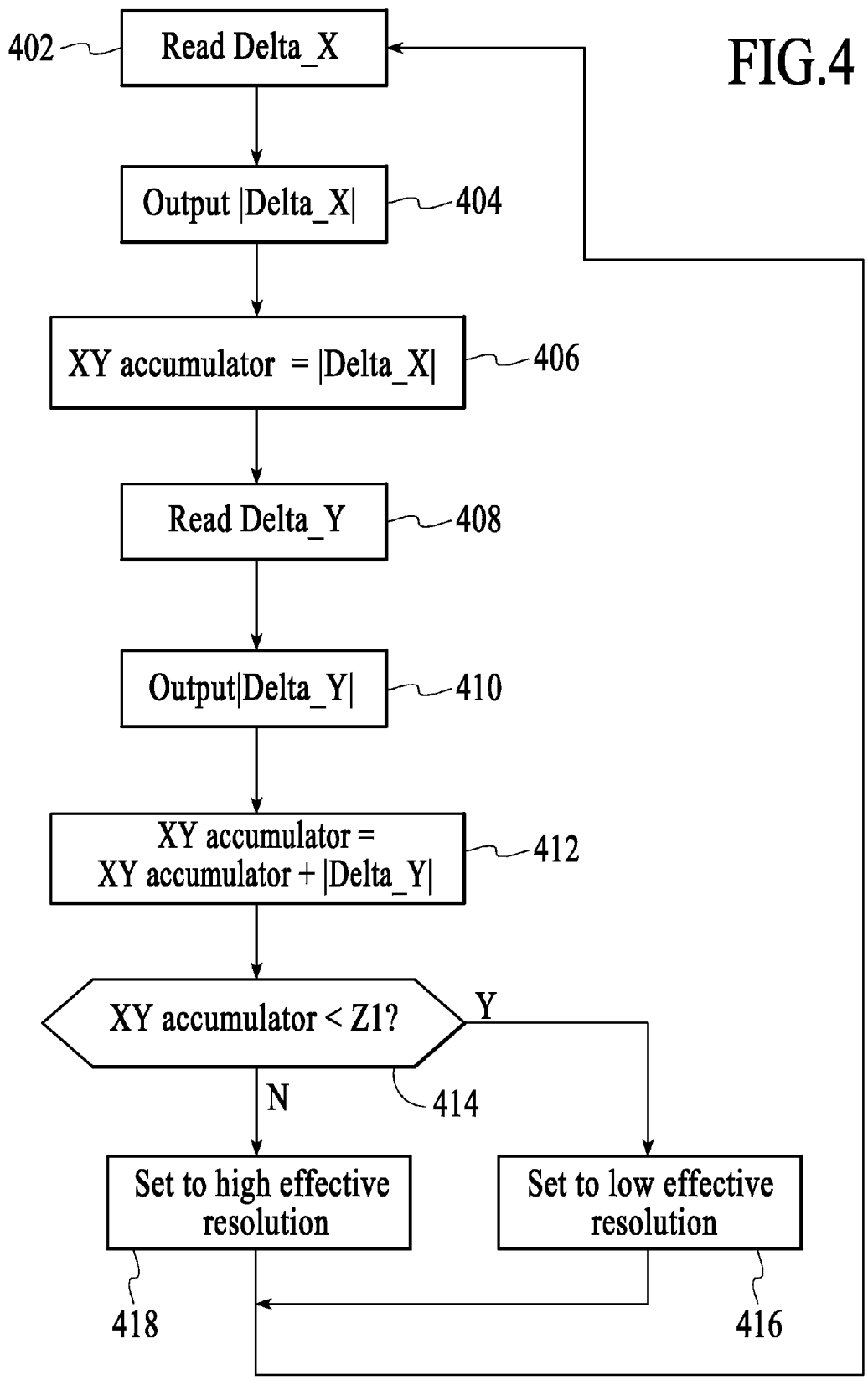
FIG. 4 is a process flow diagram of an operation of a resolution-setting module of the optical navigation system in accordance with another embodiment of the invention.

The operation of the resolution-setting module 222 in accordance with another embodiment of the invention is described with reference to a flow diagram of FIG. 4. In this embodiment, the resolution of the navigation engine 220 is fixed at a default setting of 1000 cpi in both the X and Y directions. This operation begins after the navigation engine 220 outputs the current directional delta X displacement value, Delta_X, and the current directional delta Y displacement value, Delta_Y. At block 402, Delta_X is read. Next, at block 404, the absolute value of Delta_X is outputted. In addition, the sign of Delta_X is stored for subsequent use. Next, at block 406, XY accumulator is set to the absolute value of Delta_X. Next, at block 408, Delta_Y is read. Next, at block 410, the absolute value of Delta_Y is outputted. In addition, the sign of Delta_Y is stored for subsequent use. Next, at block 412, XY accumulator is set to XY accumulator plus the absolute value of Delta_Y. Next, at block 414, a determination is made whether XY accumulator is less than a threshold value of Z1. Thus, in this embodiment, XY accumulator is used as a comparison displacement value, which indicates the current speed of the optical navigation system 100. The Z1 value represents the number of pixels that corresponds to a predefined threshold speed of the optical navigation system 100 to switch the resolution between a high effective resolution, e.g., 1000 cpi, and a low effective resolution, e.g., 500 cpi. As an example, the Z1 value may be the number of pixels that equals a movement at 3 ips.

If XY accumulator is less than Z1, then the operation proceeds to block 416, where the optical navigation resolution is set to the low effective resolution. In this embodiment, the optical navigation resolution is set to the low effective resolution by adjust the resolution setting of the navigation engine 220 to a lower resolution that corresponds to the low effective resolution. If XY accumulator is not less than Z1, then the operation proceeds to block 418, where the optical navigation resolution is set to the high effective resolution. In this embodiment, the optical navigation resolution is set to the high effective resolution by not changing the resolution setting of the navigation engine 220, which is currently set to a resolution that corresponds to the high effective resolution.

The operation then proceeds back to block 402 to set the optical navigation resolution using the latest Delta_X and Delta_Y. Blocks 402-418 may be executed every motion read cycle. Alternatively, blocks 402-418 may be executed every Nth motion read cycle, where N is greater than one. In this fashion, the resolution of the optical navigation system 100 can be continuously adjusted depending on the speed at which the optical navigation system is being manipulated.

Figure 5:
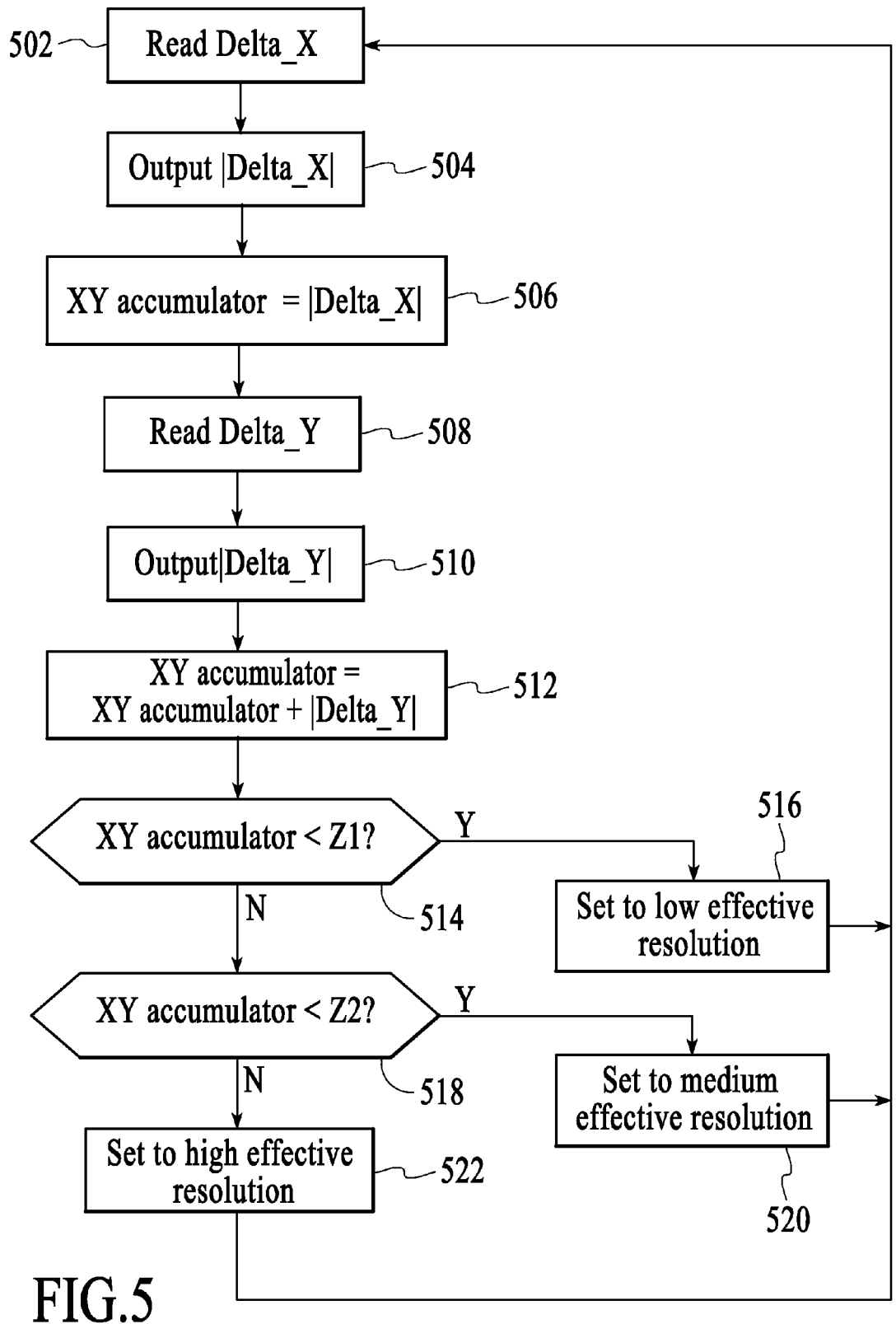
FIG. 5 is a process flow diagram of an operation of a resolution-setting module of the optical navigation system in accordance with another embodiment of the invention.

The operation of the resolution-setting module 222 in accordance with another embodiment of the invention is described with reference to a flow diagram of FIG. 5. In this embodiment, the resolution of the navigation engine 220 is fixed at a default setting of 1000 cpi in both the X and Y directions. The operation begins after the navigation engine 220 outputs the current directional delta X displacement value, Delta_X, and the current directional delta Y displacement value, Delta_Y. At block 502, Delta_X is read. Next, at block 504, the absolute value of Delta_X is outputted. In addition, the sign of Delta_X is stored for subsequent use. Next, at block 506, XY accumulator is set to the absolute value of Delta_X. Next, at block 508, Delta_Y is read. Next, at block 510, the absolute value of Delta_Y is outputted. In addition, the sign of Delta_Y is stored for subsequent use. Next, at block 512, XY accumulator is set to XY accumulator plus the absolute value of Delta_Y. Next, at block 514, a determination is made whether XY accumulator is less than a threshold value of Z1. Thus, in this embodiment, XY accumulator is used as a comparison displacement value, which indicates the current speed of the optical navigation system 100. The Z1 value represents the number of pixels that corresponds to a predefined threshold speed of the optical navigation system 100 to switch the optical navigation resolution between a medium effective resolution, e.g., 750 cpi, and a low effective resolution, e.g., 500 cpi. As an example, the Z1 value may be the number of pixels that equals a movement at 1.5 ips.

If XY accumulator is less than Z1, then the operation proceeds to block 516, where the optical navigation resolution is set to the low effective resolution. In this embodiment, at block 516, Delta_X is set to the absolute value of Delta_X divided by two and Delta_Y is set to the absolute value of Delta_Y divided by two. In addition, the signs of the original Delta_X and Delta_Y are restored to the current Delta_X and Delta_Y. Thus, the optical navigation resolution is effectively changed to the low effective resolution. If XY accumulator is not less than Z1, then the operation proceeds to block 518, where a determination is made whether XY accumulator is less than a second threshold value of Z2. The Z2 value represents the number of pixels that corresponds to a predefined threshold speed of the optical navigation system 100 to switch the optical navigation resolution between the medium effective resolution, e.g., 750 cpi, and a high effective resolution, e.g., 1000 cpi. As an example, the Z2 value may be the number of pixels that equals a movement at 3.0 ips.

If XY accumulator is less than Z2, then the operation proceeds to block 520, where the optical navigation resolution is set to the medium effective resolution. In this embodiment, at block 520, Delta_X is set to the absolute value of Delta_X times three divided by four and Delta_Y is set to the absolute value of Delta_Y times three divided by four. In addition, the signs of the original Delta_X and Delta_Y are restored to the current Delta_X and Delta_Y. Thus, the optical navigation resolution is effectively changed to the medium effective resolution. If XY accumulator is not less than Z2, then the operation proceeds to block 522, where the optical navigation is set to the high effective resolution. In this embodiment, at block 522, Delta_X is set to the absolute value of Delta_X and Delta_Y is set to the absolute value of Delta_Y. In addition, the signs of the original Delta_X and Delta_Y are restored to the current Delta_X and Delta_Y. Thus, the optical navigation resolution is unchanged from the default resolution setting of the navigation engine 220.

The operation then proceeds back to block 502 to set the optical navigation resolution using the latest Delta_X and Delta_Y. Blocks 502-522 may be executed every motion read cycle. Alternatively, blocks 502-522 may be executed every Nth motion read cycle, where N is greater than one. In this fashion, the resolution of the optical navigation system 100 can be continuously adjusted depending on the speed at which the optical navigation system is being manipulated.

Figure 6:
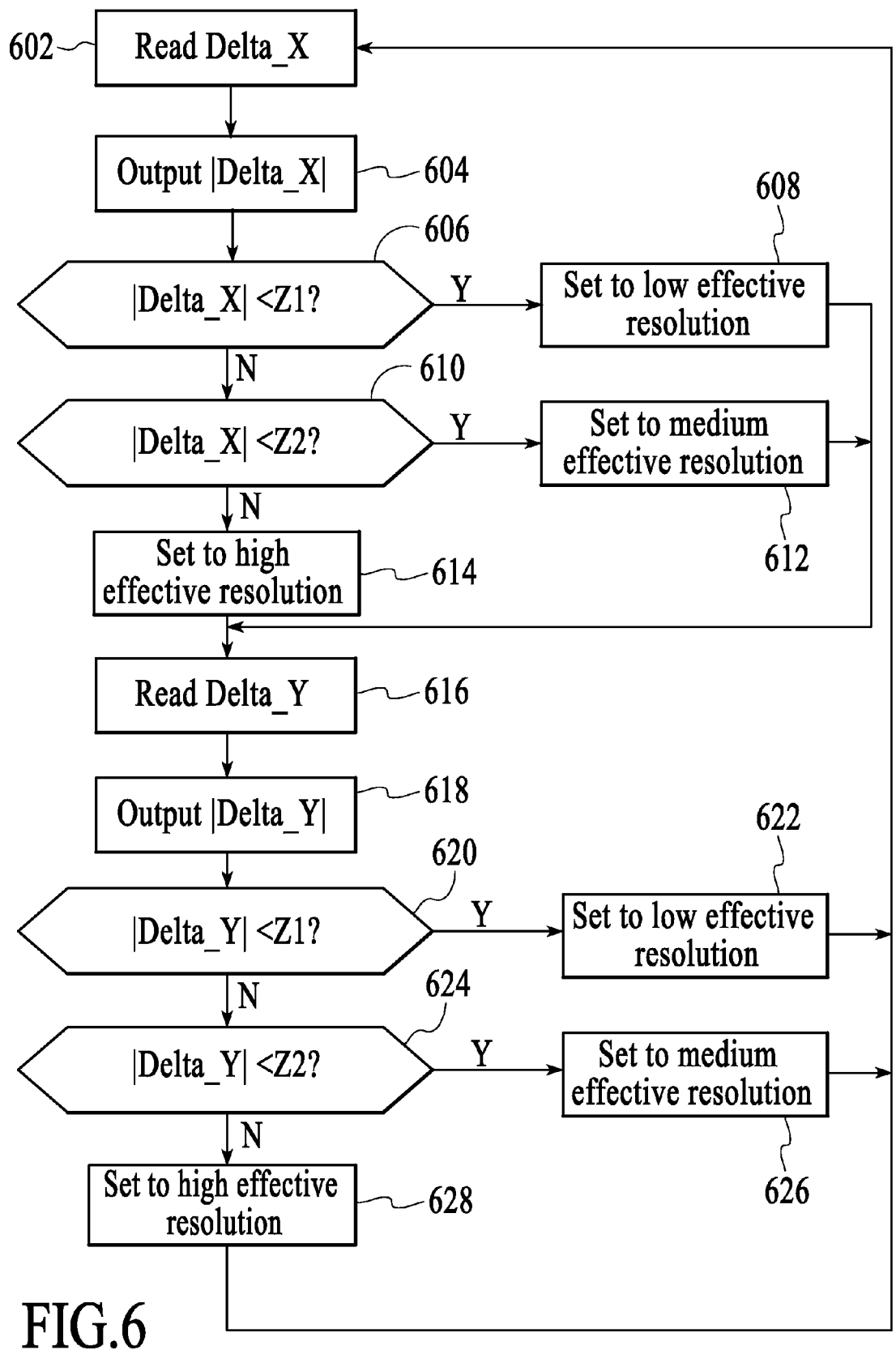
FIG. 6 is a process flow diagram of an operation of a resolution-setting module of the optical navigation system in accordance with another embodiment of the invention.

The operation of the resolution-setting module 222 in accordance with another embodiment of the invention is described with reference to a flow diagram of FIG. 6. In this embodiment, the resolution of the navigation engine 220 is fixed at a default setting of 1000 cpi in both the X and Y directions. The operation begins after the navigation engine 220 outputs the current directional delta X displacement value, Delta_X, and the current directional delta Y displacement value, Delta_Y. At block 602, Delta_X is read. Next, at block 604, the absolute value of Delta_X is outputted. In addition, the sign of Delta_X is stored for subsequent use. Next, at block 606, a determination is made whether the absolute value of Delta_X is less than Z1. Thus, in this embodiment, the absolute value of Delta_X is used as a comparison displacement value, which indicates the current speed of the optical navigation system 100 in the X direction. The Z1 value represents the number of pixels that corresponds to a predefined threshold speed of the optical navigation system 100 to switch the resolution between a medium effective resolution, e.g., 750 cpi, and a low effective resolution, e.g., 500 cpi. As an example, the Z1 value may be the number of pixels that equals a movement at 1.5 ips.

If the absolute value of Delta_X is less than Z1, then the operation proceeds to block 608, where the optical navigation resolution in the X direction is set to the low effective resolution. In this embodiment, at block 608, Delta_X is set to the absolute value of Delta_X divided by two. In addition, the sign of the original Delta_X is restored to the current Delta_X. Thus, the optical navigation resolution in the X direction is effectively changed to the low effective resolution.

If the absolute value of Delta_X is not less than Z1, then the operation proceeds to block 610, where a determination is made whether the absolute value of Delta_X is less than Z2. The Z2 value represents the number of pixels that corresponds to a predefined threshold speed of the optical navigation system 100 to switch the optical navigation resolution between a high effective resolution, e.g., 1000 cpi, and the medium effective resolution, e.g., 750 cpi. As an example, the Z2 value may be the number of pixels that equals a movement at 3.0 ips.

If the absolute value of Delta_X is less than Z2, then the operation proceeds to block 612, where the optical navigation resolution in the X direction is set to the medium effective resolution. In this embodiment, at block 612, Delta_X is set to the absolute value of Delta_X times three divided by four. In addition, the sign of the original Delta_X is restored to the current Delta_X. Thus, the optical navigation resolution in the X direction is effectively changed to the medium effective resolution.

If the absolute value of Delta_X is not less than Z2, then the operation proceeds to block 614, where the optical navigation resolution in the X direction is set to the high effective resolution. In this embodiment, at block 614, Delta_X is set to the absolute value of Delta_X. In addition, the sign of the original Delta_X is restored to the current Delta_X. Thus, the optical navigation resolution in the X direction is unchanged from the default resolution setting of the navigation engine 220.

The operation then proceeds to block 616, where Delta_Y is read. Next, at block 618, the absolute value of Delta_Y is outputted. In addition, the sign of Delta_Y is stored for subsequent use. Next, at block 620, a determination is made whether the absolute value of Delta_Y is less than Z1. Thus, in this embodiment, the absolute value of Delta_Y is used as another comparison displacement value, which indicates the current speed of the optical navigation system 100 in the Y direction.

If the absolute value of Delta_Y is less than Z1, then the operation proceeds to block 622, where the optical navigation resolution in the Y direction is set to the low effective resolution. In this embodiment, at block 622, Delta_Y is set to the absolute value of Delta_Y divided by two. In addition, the sign of the original Delta_Y is restored to the current Delta_Y. Thus, the optical navigation resolution in the Y direction is effectively changed to the low effective resolution.

If the absolute value of Delta_Y is not less than Z1, then the operation proceeds to block 624, where a determination is made whether the absolute value of Delta_Y is less than Z2. If the absolute value of Delta_X is less than Z2, then the operation proceeds to block 626, where the optical navigation resolution in the Y direction is set to the medium effective resolution. In this embodiment, at block 626, Delta_Y is set to the absolute value of Delta_Y times three divided by four. In addition, the sign of the original Delta_Y is restored to the current Delta_Y. Thus, the optical navigation resolution in the Y direction is effectively changed to the medium effective resolution.

If the absolute value of Delta_Y is not less than Z2, then the operation proceeds to block 628, where the optical navigation resolution in the Y direction is set to the high effective resolution. In this embodiment, at block 628, Delta_Y is set to the absolute value of Delta_Y. In addition, the sign of the original Delta_Y is restored to the current Delta_X. Thus, the optical navigation resolution in the Y direction is unchanged from the default resolution setting of the navigation engine 220.

The operation then proceeds back to block 602 to individually and independently set the optical navigation resolution in the X direction and the optical navigation resolution in the Y direction using the latest Delta_X and Delta_Y. Blocks 602-628 may be executed every motion read cycle. Alternatively, blocks 602-628 may be executed every Nth motion read cycle, where N is greater than one. In this fashion, the resolution of the optical navigation system 100 can be continuously adjusted depending on the speed at which the optical navigation system is being manipulated.

Figure 7:
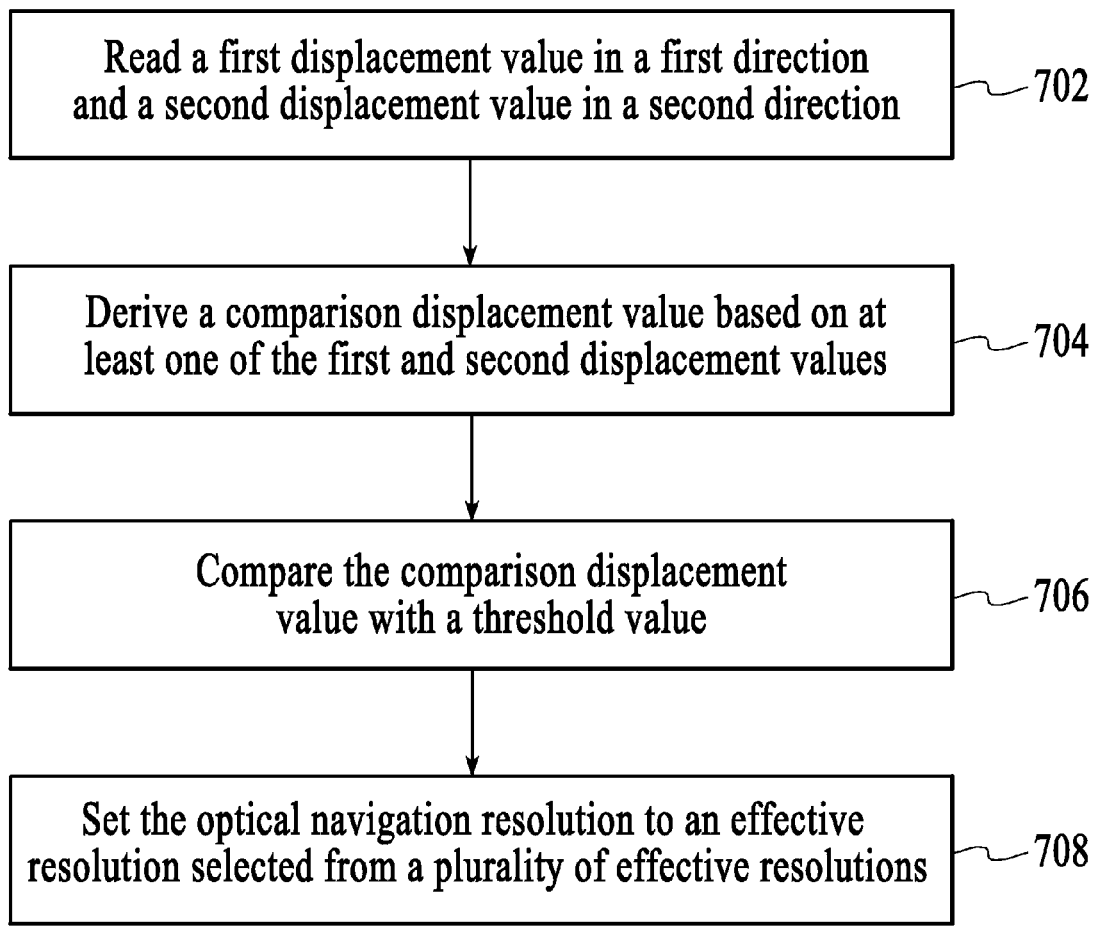
FIG. 7 is a process flow diagram of a method for selectively setting an optical navigation resolution in accordance with an embodiment of the invention.

A method for selective setting an optical navigation resolution in accordance with an embodiment of the invention is described with reference to a process flow diagram of FIG. 7. At block 702, a first displacement value in a first direction and a second displacement value in a second direction are read. The first and second displacement values are derived for estimating motion. Next, at block 704, a comparison displacement value is derived based on at least one of the first and second displacement values. Next, at block 706, the comparison displacement value is compared to a threshold value. Next, at block 708, the optical navigation resolution is set to an effective resolution selected from a plurality of effective resolutions in response to the comparing of the comparison displacement value to the threshold value.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for selectively setting an optical navigation resolution, said method comprising:
reading a first displacement value in a first direction and a second displacement value in a second direction, said first and second displacement values being used for estimating motion;
deriving a comparison displacement value based on at least one of said first and second displacement values;
comparing said comparison displacement value to a threshold value; and
setting said optical navigation resolution to an effective resolution selected from a plurality of effective resolutions as a result of said comparing of said comparison displacement value to said threshold value.

2. The method of claim 1 wherein said comparing includes comparing an absolute value of said first displacement value to said threshold value.

3. The method of claim 2 wherein said setting includes setting only a first direction resolution of said optical navigation resolution to said effective resolution in accordance with the result of said comparing of said comparison displacement value to said threshold value, said first direction resolution being a resolution in said first direction.

4. The method of claim 3 further comprising:
comparing an absolute value of said second displacement value to said threshold value; and
setting only a second direction resolution of said optical navigation resolution to a second effective resolution selected from said plurality of effective resolutions, said second direction resolution being a resolution in said second direction.

5. The method of claim 2 further comprising comparing an absolute value of said second displacement value to said threshold value.

6. The method of claim 2 further comprising comparing said absolute value of said first displacement value to a second threshold value.

7. The method of claim 1 wherein said comparing includes comparing a sum of an absolute value of said first displacement value and an absolute value of said second displacement value to said threshold value.

8. The method of claim 7 further comprising comparing said sum of said absolute value of said first displacement value and said absolute value of said second displacement value to a second threshold value.

9. The method of claim 1 wherein said setting includes proportionally changing at least one of said first and second displacement values according to said effective resolution.

10. The method of claim 9 wherein said proportionally changing at least one of said first and second displacement values includes multiplying at least one of said first and second displacement values by a ratio of the current resolution of said first and second displacement values and said effective resolution.

11. A system comprising:
an image sensor configured to capture frames of image data;
a navigation engine operably connected to said image sensor to receive said frames of image data, said navigation engine being configured to generate a first displacement value in a first direction and a second displacement value in a second direction using said frames of image data; and
a resolution-setting module operably connected to said navigation engine to receive said first and second displacement values, said resolution-setting module being configured to derive a comparison displacement value based on at least one of said first and second displacement values and to set an optical navigation resolution to an effective resolution selected from a plurality of effective resolutions as a result of a comparison of said comparison displacement value to a threshold value.

12. The system of claim 11 wherein said resolution-setting module is configured to compare an absolute value of said first displacement value to said threshold value.

13. The system of claim 12 wherein said resolution-setting module is configured to set only a first direction resolution of said optical navigation resolution to said effective resolution in accordance with the result of said comparison of said comparison displacement value to said threshold value, said first direction resolution being a resolution in said first direction.

14. The system of claim 12 wherein said resolution-setting module is further configured to compare an absolute value of said second displacement value to said threshold value and to set only a second direction resolution of said optical navigation resolution to a second effective resolution selected from said plurality of effective resolutions, said second direction resolution being a resolution in said second direction.

15. The system of claim 12 wherein said resolution-setting module is configured to compare an absolute value of said second displacement value to said threshold value.

16. The system of claim 12 wherein said resolution-setting module is configured to compare said absolute value of said first displacement value to a second threshold value.

17. The system of claim 12 wherein said resolution-setting module is configured to proportionally change at least one of said first and second displacement values according to said effective resolution.

18. The system of claim 12 wherein said resolution-setting module is configured to multiply at least one of said first and second displacement values by a ratio of the current resolution of said first and second displacement values and said effective resolution.

19. The system of claim 11 wherein said resolution-setting module is configured to compare a sum of an absolute value of said first displacement value and an absolute value of said second displacement value to said threshold value.

20. The system of claim 19 wherein said resolution-setting module is configured to compare said sum of said absolute value of said first displacement value and said absolute value of said second displacement value to a second threshold value.

* * * * *